United States Patent

Huemer et al.

[11] Patent Number: 5,960,872
[45] Date of Patent: Oct. 5, 1999

[54] DEVICE FOR STABILIZING THE TEMPERATURE OF THE TRANSMISSION OIL OF A MOTOR VEHICLE

[75] Inventors: Gerhart Huemer, Munich; Heinz Lemberger, Unterfoehring; Winfrid Eckerskorn, Ottobrunn; Christian Absmeier, Hoergertshausen; Axel Temmesfeld, Raubling; Victor Brost, Aichtal; Karl Schuetterle, Walddorfhaeslach; Klaus Kalbacher, Rangendingen, all of Germany

[73] Assignees: Bayerische Motoren Werke Aktiengesellschaft, Munich, Germany; Modine Laengerer & Reich GmbH, Filderstadt, Germany

[21] Appl. No.: 08/794,517

[22] Filed: Feb. 3, 1997

[30] Foreign Application Priority Data

Feb. 1, 1996 [DE] Germany ............... 196 03 644

[51] Int. Cl.⁶ .................................... G05D 23/00
[52] U.S. Cl. .................... 165/298; 165/296; 165/299; 165/916; 123/41.42; 123/41.44; 123/196 AB
[58] Field of Search ..................... 165/298, 296, 165/299, 916, 287, 71; 123/41.42, 41.44, 196 AB, 196 V

[56] References Cited

U.S. PATENT DOCUMENTS

| 1,131,444 | 3/1915 | Tyson et al. ......................... 165/299 |
| 1,710,278 | 4/1929 | Tulowitz ............................. 165/296 |
| 1,748,369 | 2/1930 | Snediker ............................. 165/299 |
| 1,881,771 | 10/1932 | Lyman ............................... 165/299 |
| 1,907,033 | 5/1933 | Askin ................................ 165/916 |
| 1,918,471 | 7/1933 | Hawkins ............................. 165/916 |
| 2,013,708 | 9/1935 | Bianchi et al. ...................... 165/916 |
| 2,070,092 | 2/1937 | Ramsaur ............................. 165/916 |
| 2,141,926 | 2/1938 | Moncrief ............................. 165/299 |
| 2,175,432 | 10/1939 | Gerstung ............................. 165/299 |
| 2,261,418 | 11/1941 | Schwarz .............................. 165/299 |
| 2,291,607 | 8/1942 | Chausson ............................. 165/299 |
| 2,336,840 | 12/1943 | Brehob ............................... 165/299 |
| 2,474,518 | 6/1949 | Davis ................................ 165/916 |
| 2,756,026 | 7/1956 | Myrent et al. ....................... 165/299 |
| 2,844,319 | 7/1958 | McGrath ............................. 165/299 |
| 3,595,306 | 7/1971 | Bickerdike .......................... 165/287 |
| 3,727,712 | 4/1973 | Colloton ............................ 165/916 |
| 3,812,872 | 5/1974 | Block et al. ........................ 165/71 |
| 3,819,113 | 6/1974 | Puster et al. ....................... 165/287 |
| 4,007,780 | 2/1977 | Caldewll et al. .................... 165/299 |
| 4,150,786 | 4/1979 | Sable ............................... 165/287 |
| 4,705,100 | 11/1987 | Black et al. ........................ 165/296 |
| 5,244,036 | 9/1993 | Michl ............................... 165/916 |

FOREIGN PATENT DOCUMENTS

| 0 467 130 | 1/1992 | European Pat. Off. . |
| 0 736 703 | 10/1996 | European Pat. Off. . |
| 22 50 335 | 5/1973 | Germany . |
| 32 01 443 | 5/1983 | Germany . |
| 34 03 435 | 8/1984 | Germany . |
| 35 27 020 | 1/1987 | Germany . |
| 37 05 232 | 9/1988 | Germany . |
| 40 35 179 | 5/1992 | Germany . |
| 40 32 701 | 6/1992 | Germany . |
| 42 11 588 | 10/1993 | Germany . |
| 43 04 743 | 8/1994 | Germany . |
| 44 31 351 | 3/1996 | Germany . |

*Primary Examiner*—Ira A. Lazarus
*Assistant Examiner*—Terrell McKinnon
*Attorney, Agent, or Firm*—Evenson, McKeown, Edwards & Lenahan, PLLC

[57] ABSTRACT

In order to control the temperature of the transmission oil of a motor vehicle driven by a liquid-cooled engine, a coolant/transmission oil heat exchanger is provided. The coolant stream supplied to the heat exchanger is miscible in a thermostatic valve from recooled and non-recooled coolant in order to achieve a desired temperature. Preferably the thermostatic valve is controlled by the temperature of the transmission oil, but it is also possible to have two expanding material elements as control pistons of the thermostatic valve, with one control piston being provided in the oil chamber of the thermostatic valve and the other control piston being provided in the coolant mixing chamber of the thermostatic valve. It is also possible, for purposes of precontrol, to electrically heat at least one of the control pistons.

12 Claims, 2 Drawing Sheets

DEVICE FOR STABILIZING THE TEMPERATURE OF THE TRANSMISSION OIL OF A MOTOR VEHICLE

BACKGROUND AND SUMMARY OF THE INVENTION

The invention relates to a device for stabilizing the temperature of the transmission oil of a motor vehicle with a liquid-cooled engine, whose coolant, recoolable in a radiator, can be conducted as a function of temperature through a heat exchanger that can likewise be traversed by the transmission oil.

If it is necessary in motor vehicles to cool the oil of a transmission provided in the vehicle drive train (manual transmission, automatic transmission with hydraulic torque converter, or axle drive), an air/oil heat exchanger is usually provided for that purpose. In addition, it is known from German Patent document DE 32 01 443 A1 to heat the transmission oil more rapidly following a cold start of the vehicle by guiding the oil through an oil/coolant heat exchanger that is also traversed by the coolant of the engine that drives the vehicle. Since the coolant of a liquid-cooled engine, following a cold start of the motor vehicle, is heated more rapidly than the transmission oil, the transmission oil can thus be brought more rapidly to its optimum operating temperature. If these two systems were combined with one another, so that the transmission oil would be warmed more rapidly and the transmission oil could be recooled if necessary, this would involve a considerable expense since at least two heat exchangers would be required for the transmission oil. A high regulating cost is also required for this purpose if a desired oil temperature is to be reached or set.

The goal of the present invention is to describe improvements in this regard.

To achieve this goal, provision is made such that the coolant flow supplied to the transmission oil/coolant heat exchanger is miscible in a thermostatic valve from recooled as well as non-recooled coolant. Advantageous embodiments and improvements are further described herein.

According to the present invention, a single heat exchanger suffices for the transmission oil in order to control the temperature of the latter if required, in other words to heat it more rapidly following a cold start and to recool it later, with the engine coolant also being conducted through this heat exchanger at a temperature that can be controlled. For this reason, a thermostatic valve is provided that sets the temperature of the coolant stream flowing through the heat exchanger. This temperature adjustment is performed by controlled mixing of recooled and non-recooled coolant from the engine. As already mentioned above, coolants with different intrinsic temperatures are available. Firstly, the coolant derived from the engine can be used, said coolant being relatively warm, and secondly the coolant recooled in the vehicle radiator can be used, said coolant having an even lower temperature. By suitable mixing of these two coolant volumes, in other words by suitable mixing of the recooled and non-recooled coolant, a desired coolant temperature can be set in the coolant/transmission oil heat exchanger that allows for the desired transmission oil temperature control.

Preferably, provision can be made such that the thermostatic valve for mixing the recooled and non-cooled coolant is controlled by the temperature of the transmission oil. This ensures the fastest possible regulation, as well as the most reliable, since the temperature of the medium that controls the temperature of the transmission oil, namely the temperature of the coolant, is set as a function of the result of the temperature control, i.e. by the temperature of the transmission oil.

Other objects, advantages and novel features of the present invention will become apparent from the following detailed description of the invention when considered in conjunction with the accompanying drawings.

DETAILED DESCRIPTION OF THE DRAWINGS

Figure 1:
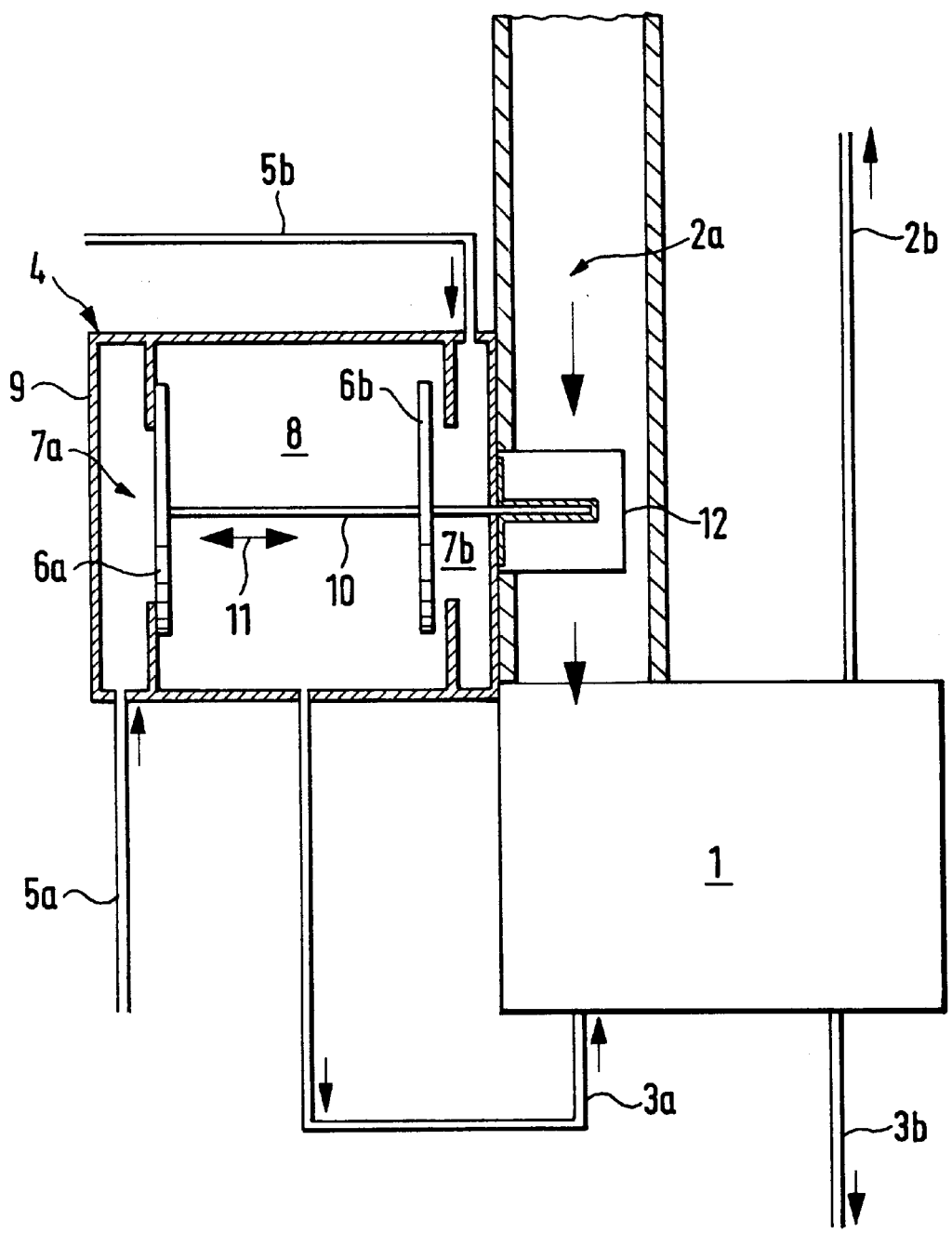
FIG. 1 is a schematic diagram of a preferred first embodiment according to the invention.

Referring to FIG. 1, the reference numeral 1 designates a liquid/liquid exchanger through which firstly the transmission oil of a motor vehicle whose temperature is to be controlled and secondly a coolant stream from the engine driving the vehicle can be conducted. Accordingly, a supply line tube 2a and a drain line 2b for the transmission oil as well as a supply line 3a and a drain line 3b for the coolant are provided. The cooling liquid stream supplied through supply line 3a can be mixed in a thermostatic valve 4 from two coolant streams that have different temperatures.

Non-recooled coolant 5a enters directly into thermostatic valve 4 from the engine (not shown), followed by re-cooled coolant 5b, which has previously passed through a radiator (vehicle radiator), in which, as is known to the individual skilled in the art, the coolant of the engine can be recooled. In thermostatic valve 4, coolant 5a can be mixed with coolant 5b in any desired amounts, with the temperature of the coolant flow that enters heat exchanger 1 through supply line 3a being capable of being deliberately set in order to achieve a desired transmission oil temperature in drain line 2b through the heat exchanging process in heat exchanger 1.

It should be expressly pointed out at this point that a mixture of recooled coolant 5b and non-recooled coolant 5a to achieve a desired temperature in the coolant supply line 3a is also to be understood as referring to the state in which only recooled coolant 5b or only non-recooled coolant 5a passes through thermostatic valve 4 into supply line 3a. In addition, this thermostatic valve 4 is designed as a conventional mixing thermostat, i.e. two valve plates 6a, 6b are provided that are assigned to the inflow cross sections 7a, 7b for coolants 5a and 5b into a mixing chamber 8 inside thermostat housing 9.

Valve plates 6a, 6b mounted on a common piston rod 10 are positioned by a control piston 12 that displaces piston rod 10 in the direction of arrow 11 and is designed as an element made of expanding material. This control piston 12 in the embodiment shown in FIG. 1 is located in supply line 2a and is therefore impacted by transmission oil whose temperature has not yet been controlled. This means that thermostatic valve 4 is controlled by the temperature of the transmission oil, which, as mentioned above, is especially advantageous from the regulation technology standpoint. Alternatively, however, it would also be possible to control thermostatic valve 4 by using the temperature of the transmission oil that leaves heat exchanger 1 through drain line 2b or by using the temperature of the coolant stream, i.e. the temperature of the essentially mixed coolant stream or in other words, by the coolant temperature in mixing chamber 8 itself.

Figure 2:
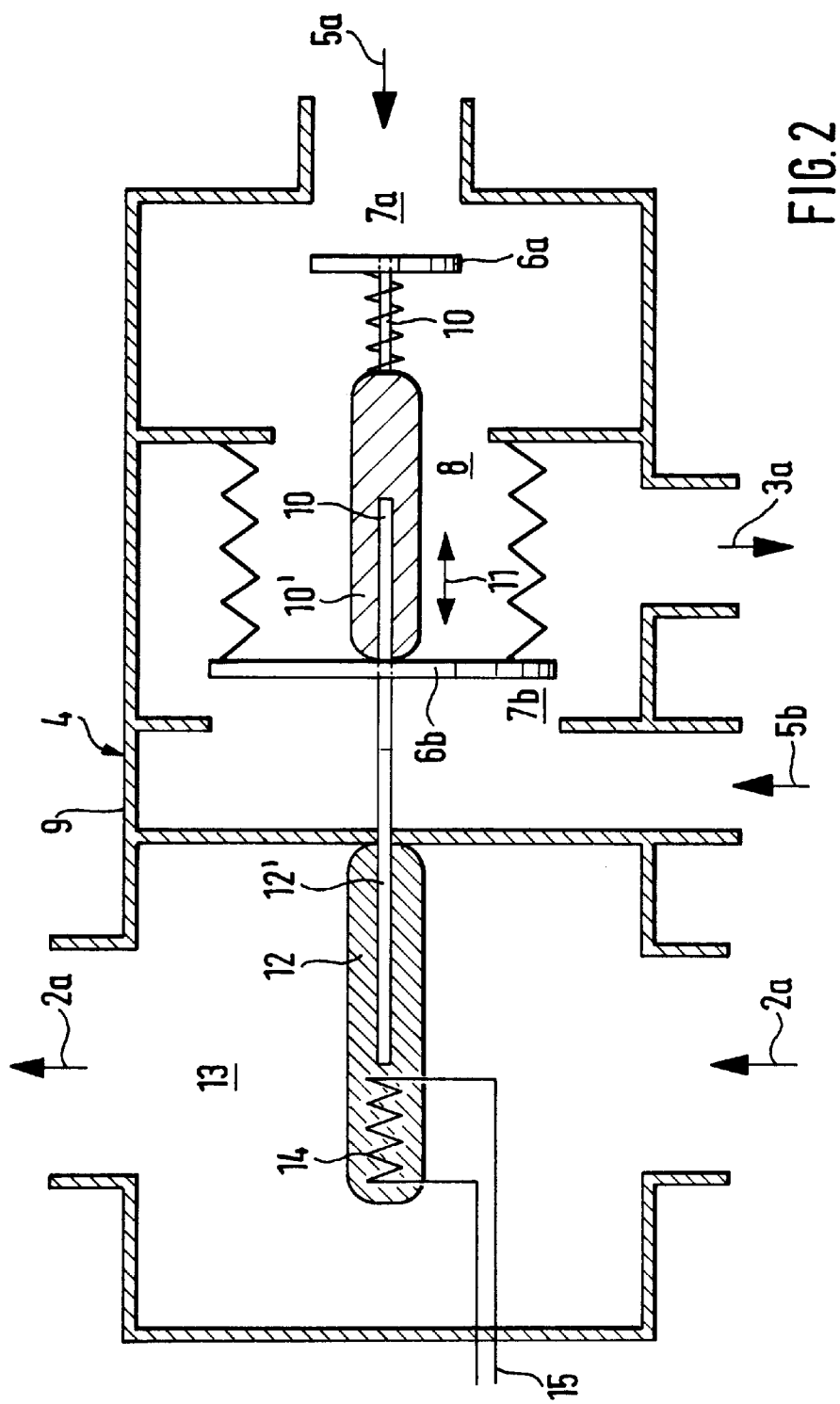
FIG. 2 is a schematic diagram of an advantageous improvement according to the present invention.

However, it is especially advantageous when control is possible both as a function of the temperature of the transmission oil and of the current coolant temperature. A preferred embodiment of this is shown in FIG. 2, with only the thermostatic valve 4 being shown in principle. The parts that are the same as in FIG. 1 have been given the same reference numbers. Thus, we again have mixing chamber 8 located inside thermostatic housing 9 with valve plates 6a, 6b that delimit inflow cross sections 7a and 7b, with a coolant supply line 3a running from the mixing chamber 8 to a heat exchanger 1 (not shown here—see FIG. 1). Here again, the two valve plates 6a, 6b are located on a piston rod 10. The rod however, in this case, is not directly connected with a control piston that is impacted by the transmission oil. Instead, in this embodiment according to FIG. 2, piston rod 10 is part of a so-called mixing chamber control piston 10' provided in mixing chamber 8, said piston again being designed in the form of an expanding-material element. This means that valve plates 6a, 6b can be displaced as a function of the temperature of the coolant in mixing chamber 8 in the direction of arrow 11.

However, in FIG. 2, a control piston 12 is again provided that is impacted by the transmission oil and is designed as an expanding material element. This piston 12 is located in a so-called oil chamber 13 of thermostatic valve 4 that is integrated into transmission oil supply line 2a and is therefore referred to as a so-called oil chamber control piston 12. A separate piston rod 12' is associated with this oil chamber control piston 12, with piston rod 10 of mixing chamber control piston 10' abutting the free end of said rod. In this manner, with a suitable change in shape of oil chamber control piston 12, the two valve plates 6a, 6b can again be displaced in the direction of arrow 11, resulting in a change in free inflow cross sections 7a, 7b and thus influencing the temperature of the coolant stream located in mixing chamber 8.

In FIG. 2, the two valve plates 6a, 6b in mixing chamber 8 are approximately at their middle positions. Thus, a coolant stream flows through heat exchanger 1 as shown in FIG. 1 that has an approximately medium temperature, so that in heat exchanger 1 the transmission oil likewise undergoes a slight cooling as it passes through. If the temperature of the transmission oil should increase for some reason relating to loading, this causes oil chamber control piston 12 to expand so that its piston rod 12' and hence piston rod 10 as well are displaced toward the right starting at the position shown. The inflow cross section 7a for non-recooled coolant 5a is closed as a result, so that a larger amount of recooled coolant 5b flows through inflow cross section 7b into mixing chamber 8, and from there through coolant supply line 3a into heat exchanger 1. As a result, the transmission oil is recooled to a greater degree in heat exchanger 1. Finally, if the temperature of the transmission oil drops again, oil chamber control piston 12 changes its shape accordingly in such fashion that piston rod 12' as well as piston rod 10 are again displaced leftward and a greater amount of non-recooled coolant 5a can pass through coolant supply line 3a into heat exchanger 1.

In addition to the above-described operation of the coolant flow temperature control as a function of the temperature of the transmission oil, thermostatic valve 4 also permits control as a function of the coolant temperature itself. Thus, immediately following a cold start of the engine, when the coolant is still cold, piston rod 10 assumes a position due to a suitable shape of mixing chamber control piston 10' such that inflow cross section 7b is closed and inflow cross section 7a is completely open. Beginning at the position shown in FIG. 2, valve plates 6a, 6b are thus displaced leftward. If on the other hand the coolant is heated, for example by an extreme load on the engine, so that the transmission oil would be unnecessarily or inadmissibly heated in heat exchanger 1, inflow cross section 7a for non-recooled coolant is closed under the influence of mixing chamber control piston 10 and inflow cross section 7b for recooled coolant 5b is completely open. Then, piston rod 10 with the two valve plates 6a, 6b, starting from the position shown, would be displaced against its right-hand stop. By suitable adjustment, it is therefore possible with thermostatic valve 4 described above, in all possible operating states, to set the desired coolant temperature in heat exchanger 1 in order to achieve the desired transmission oil temperature.

With the goal of providing an especially advantageous improvement on the invention, at least one of the two control pistons 10', 12, in this case the oil chamber control piston 12 formed of a corresponding expanding material element, can be heated electrically. For this purpose, a heating element 14 is provided in control piston 12. The heating element 14, under the control of an electronic control unit (not shown) is connectable with an electrical power supply 15. As a result, a form of temperature precontrol is possible, as also described in German Patent application P 195 12 783 (not previously published). If for example, due to some boundary conditions, it is determined that the transmission oil temperature is expected to rise sharply within a short time interval, oil chamber control piston 12 or the corresponding expanding material element can already be heated in a preventive manner so that it expands, displacing its piston rod 12' and hence the two valve plates 6a, 6b to the right. This is done so that the inflow cross section 7a for non-recooled coolant 5a is closed. Even before the transmission oil has actually reached the higher temperature, because of the high percentage of recooled coolant 5b in heat exchanger 1, greater recooling of this transmission oil takes place so that undesired temperature excesses are avoided. With electrical heating of at least one of the two control pistons 10' or 12, it is possible to set the transmission temperature not only for the purpose of precontrol but also in general for a desired temperature value. A number of the details, especially of a structural nature, can be made different from the embodiments shown without departing from the scope of the patent claims, as would be readily understood by one skilled in the art.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for controlling temperature of a transmission oil of a motor vehicle having a liquid-cooled vehicle engine and a radiator in which coolant of the liquid-cooled vehicle engine is recoolable, the device comprising:

a heat exchanger through which the coolant is conducted as a function of temperature, said heat exchanger also being traversed by the transmission oil;

wherein the coolant supplied to the heat exchanger is miscible in a thermostatic valve from recooled and non-recooled coolant; and wherein the thermostatic valve is controlled via temperatures of an essentially mixed coolant stream and wherein the thermostatic valve is displaceable to close-off both the recooled and non-recooled coolant flows.

2. The device according to claim 1, wherein said thermostatic valve is controlled via the temperature of the transmission oil.

3. The device according to claim 1, wherein said thermostatic valve comprises at least one control piston formed as an expanding material element, said expanding material element carrying valve plates for changing inflow cross sections of a mixing chamber in a thermostat housing of said thermostatic valve.

4. The device according to claim 2, wherein said thermostatic valve comprises at least one control piston formed as an expanding material element, said expanding material element carrying valve plates for changing inflow cross sections of a mixing chamber in a thermostat housing of said thermostatic valve.

5. The device according to claim 3, wherein one control piston is provided both in the mixing chamber and in an oil chamber, which is traversed by the transmission oil, of the thermostat housing, and wherein the one control piston provided in the mixing chamber abuts the one control piston provided in the oil chamber.

6. The device according to claim 4, wherein one control piston is provided both in the mixing chamber and in an oil chamber, which is traversed by the transmission oil, of the thermostat housing, and wherein the one control piston provided in the mixing chamber abuts the one control piston provided in the oil chamber.

7. A device for controlling temperature of a transmission oil of a motor vehicle having a liquid-cooled vehicle engine and a radiator in which coolant of the liquid-cooled vehicle engine is recoolable, the device comprising:

a heat exchanger through which the coolant is conducted as a function of temperature, said heat exchanger also being traversed by the transmission oil;

wherein the coolant supplied to the heat exchanger is miscible in a thermostatic valve from recooled and non-recooled coolant;

wherein said thermostatic valve comprises at least one control piston formed as an expanding material element, said expanding material element carrying valve plates for changing inflow cross sections of a mixing chamber in a thermostat housing of said thermostatic valve;

wherein the thermostatic valve is controlled via temperatures of an essentially mixed coolant stream; and wherein one control piston is provided both in the mixing chamber and in an oil chamber, which is traversed by the transmission oil, of the thermostat housing, and wherein the one control piston provided in the mixing chamber has a free end abutting the one control piston provided in the oil chamber, the free end allowing the pistons to separate from one another.

8. The device according to claim 3, wherein said at least one control piston is electrically heatable.

9. The device according to claim 4, wherein said at least one control piston is electrically heatable.

10. The device according to claim 5, wherein said at least one control piston is electrically heatable.

11. The device according to claim 6, wherein said at least one control piston is electrically heatable.

12. The device according to claim 7, wherein said at least one control piston is electrically heatable.

* * * * *